· US011276893B2

(12) United States Patent
Kim et al.

(10) Patent No.: US 11,276,893 B2
(45) Date of Patent: Mar. 15, 2022

(54) POUCH SECONDARY BATTERY AND METHOD OF FABRICATING THE SAME

(71) Applicant: SK INNOVATION CO., LTD., Seoul (KR)

(72) Inventors: Tae Il Kim, Daejeon (KR); Dong Ju Kim, Daejeon (KR); Sung Yeop Kim, Daejeon (KR); Jin Go Kim, Daejeon (KR); Seung Noh Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 91 days.

(21) Appl. No.: 16/444,887

(22) Filed: Jun. 18, 2019

(65) Prior Publication Data

US 2019/0305260 A1  Oct. 3, 2019

Related U.S. Application Data

(63) Continuation of application No. PCT/KR2017/015154, filed on Dec. 20, 2017.

(30) Foreign Application Priority Data

Dec. 20, 2016 (KR) .................. 10-2016-0174846
Dec. 20, 2017 (KR) .................. 10-2017-0175973

(51) Int. Cl.
*H01M 50/10* (2021.01)
*H01M 50/116* (2021.01)
(Continued)

(52) U.S. Cl.
CPC .......... *H01M 50/10* (2021.01); *H01M 10/04* (2013.01); *H01M 10/049* (2013.01);
(Continued)

(58) Field of Classification Search
CPC .................. H01M 50/105; H01M 50/124
See application file for complete search history.

(56) References Cited

U.S. PATENT DOCUMENTS

2009/0311592 A1\* 12/2009 You ................... H01M 10/0436
429/162
2010/0047685 A1\* 2/2010 Lee ..................... H01M 50/543
429/176
(Continued)

FOREIGN PATENT DOCUMENTS

CN   101312253 A   11/2008
CN   101855748 A   10/2010
(Continued)

OTHER PUBLICATIONS

International Search Report dated Mar. 28, 2018.
(Continued)

*Primary Examiner* — Jeffrey T Barton
*Assistant Examiner* — Jessie L. Walls
(74) *Attorney, Agent, or Firm* — IP & T Group LLP

(57) ABSTRACT

A pouch secondary battery is disclosed. One aspect of the present invention provides a pouch secondary battery including a casing configured to accommodate an electrode assembly from which electrode tabs are led; and the casing includes a sealing portion formed on three sides of four sides of the pouch secondary battery and a close contact portion formed on the remaining one side; and an extending portion protruding perpendicularly with respect to the close contact portion is formed in a portion adjacent to the close contact portion in the sealing portion.

10 Claims, 4 Drawing Sheets

(51) Int. Cl.
*H01M 50/183* (2021.01)
*H01M 50/105* (2021.01)
*H01M 50/124* (2021.01)
*H01M 50/102* (2021.01)
*H01M 10/04* (2006.01)
*H01M 50/20* (2021.01)

(52) U.S. Cl.
CPC ....... *H01M 50/105* (2021.01); *H01M 50/116* (2021.01); *H01M 50/124* (2021.01); *H01M 50/183* (2021.01); *H01M 50/20* (2021.01); *H01M 50/102* (2021.01); *H01M 2220/20* (2013.01)

(56) References Cited

U.S. PATENT DOCUMENTS

2013/0189554 A1* 7/2013 Schmieder ............ H01M 50/20
429/99
2019/0027714 A1* 1/2019 Jung ................... H01M 50/557

FOREIGN PATENT DOCUMENTS

| CN | 1024730 A | 5/2012 |
|---|---|---|
| CN | 103201870 A | 7/2013 |
| CN | 103219479 A | 7/2013 |
| CN | 103314468 A | 9/2013 |
| CN | 103339760 A | 10/2013 |
| CN | 105122494 A | 12/2015 |
| CN | 105900274 A | 8/2016 |
| CN | 205452481 U | 8/2016 |
| CN | 106067525 A | 11/2016 |
| CN | 208045659 U | 11/2018 |
| CN | 109643768 A | 4/2019 |
| EP | 3382771 A1 | 10/2018 |
| JP | 2001-060452 A | 3/2001 |
| JP | 200160452 A † | 3/2001 |
| JP | 2004-071301 | 3/2004 |
| JP | 200471301 A † | 3/2004 |
| JP | 4140311 B2 | 8/2008 |
| KR | 10-2006-0037827 | 5/2006 |
| KR | 20070102768 A † | 10/2007 |
| KR | 10-0895202 | 5/2009 |
| KR | 10-2010-0090141 A | 8/2010 |
| KR | 10-0998845 | 12/2010 |
| KR | 10-1175057 B1 | 8/2012 |
| KR | 20130132459 A † | 12/2013 |
| KR | 10-1520153 | 5/2015 |
| KR | 10-2015-0061990 | 6/2015 |
| KR | 10-2016-0045468 A | 4/2016 |
| TW | 423172 B | 2/2001 |

OTHER PUBLICATIONS

Extended European Search Report issued by the European Patent Office dated Jul. 28, 2020.
Office Action issued by the CNIPA dated Aug. 13, 2021.

\* cited by examiner
† cited by third party

POUCH SECONDARY BATTERY AND METHOD OF FABRICATING THE SAME

CROSS-REFERENCE TO RELATED APPLICATION

This application is a continuation of PCT/KR2017/015154 filed on Dec. 20, 2017 which claims priority of Korean patent application number 10-2016-0174846 filed on Dec. 20, 2016 and Korean patent application number 10-2017-0175973 filed on Dec. 20, 2017. The disclosure of each of the foregoing applications is incorporated herein by reference in its entirety.

TECHNICAL FIELD

Various embodiments of the present invention relate generally to a pouch secondary battery and a method of fabricating the same. More particularly, various embodiments of the present invention relate to a pouch secondary battery including a casing configured to enclose an electrode assembly.

BACKGROUND ART

As low-carbon green growth is emerging as a global issue, the green energy industry is receiving great attention. Recently, the development of electric vehicles and energy storage devices for storing renewable energy have been attracting great attention in dealing with the depletion of fossil fuels and reduction in carbon dioxide.

Unlike internal combustion engine vehicles, electric vehicles which are powered only by electric energy stored in a secondary battery do not generate any exhaust gases. However, powering an electric vehicle solely based on electric energy from a secondary battery requires that the secondary battery has high energy density for reducing the volume and weight of the battery. Although significant advances have been made, there exists a strong demand for improved, higher energy density secondary batteries for electric vehicles. Also, there is strong demand for extending the lifespan of such secondary batteries, and for maintaining their performance even when they are exposed to high temperatures for a long time.

SUMMARY OF THE INVENTION

Various embodiments of the present invention provide a pouch secondary battery, and a method of fabricating the same. The pouch secondary battery is advantageous over existing pouch secondary batteries in that it exhibits enhanced energy density.

Various embodiments of the present invention provide a pouch secondary battery module or system comprising a plurality of pouch secondary batteries, and a method of fabricating the same.

The pouch secondary battery may occupy less space by employing an improved, less bulky configuration.

Generally, the pouch secondary battery may employ a reduced volume casing which allows for the reduction of the overall volume and weight of the module.

The pouch secondary battery may be, according to some embodiments a lithium ion pouch secondary battery, or a lithium ion polymer pouch secondary battery, however, the invention may not be limited in this way.

Various embodiments of the present invention provide a pouch secondary battery having a reduced volume by controlling the volume of a sealing portion of a casing which encloses an electrode assembly of the pouch secondary battery secondary battery and a method of fabricating the same.

Various embodiments of the present invention provide a pouch secondary battery having a reduced volume by reducing the volume of a sealing portion of a casing which encloses an electrode assembly of the pouch secondary battery secondary battery and a method of fabricating the same. The casing may sealingly enclose the electrode assembly while allowing one or more electrode taps to protrude through the casing to the outside of the casing.

Various embodiments of the present invention provide a pouch secondary battery and a pouch secondary battery module having improved cooling efficiency, and a method of fabricating the same.

Various embodiments of the present invention provide a pouch secondary battery including a casing configured to accommodate an electrode assembly from which electrode tabs are led; and the casing includes a sealing portion formed on three of four sides of the pouch secondary battery and includes a close contact portion formed on the one remaining side; and an extending portion protruding perpendicularly with respect to the close contact portion is formed in the sealing portion in a portion adjacent to the close contact portion.

A concave portion may be formed in a longitudinal direction of the close contact portion.

A plurality of accommodation spaces configured to accommodate the electrode assembly and a rounded portion having an upwardly convex shape located at a gap between the plurality of accommodation spaces may be formed in the casing before the electrode assembly is accommodated in the casing, and the concave portion may be at least a part of the rounded portion.

The casing may be made of any suitable material including but not limited to aluminum, or an aluminum alloy.

Another aspect of the present invention provides a method of fabricating a pouch secondary battery, the method including: providing an electrode assembly at which electrode tabs are connected; forming a casing on which a rounded portion of an upwardly convex shape is formed at a gap between a plurality of accommodation spaces configured to accommodate an electrode assembly; accommodating the electrode assembly in one of the plurality of accommodation spaces of the casing so that the electrode tab is led to an outside; forming a close contact portion, which is brought into close contact with at least one side surface of side surfaces of the electrode assembly, on the casing in a state in which the electrode assembly is accommodated in the accommodation space; forming a sealing portion by bonding the casing at portions other than the close contact portion; and forming an extending portion protruding perpendicularly with respect to the close contact portion by a predetermined length in the sealing portion at a portion adjacent to the close contact portion.

A press in which a plurality of accommodation spaces and a rounded part of an upwardly convex shape formed at a gap between the accommodation spaces are formed may be used to form a shape of the casing, and the casing may be provided in a sheet form and may be pressed to the side in which the press is located.

The rounded portion may be spread along at least one side surface of the side surfaces of the electrode assembly when the one remaining accommodation space of the plurality of accommodation spaces covers the electrode assembly.

The rounded portion is spread and a close contact portion which is brought into close contact with the electrode assembly may be formed.

The casing may include aluminum or an aluminum alloy.

ADVANTAGEOUS EFFECTS

Embodiments of the present invention provide a pouch secondary battery capable of improving density of a secondary battery by forming a sealing portion of the pouch secondary battery to be reduced and a fabricating method.

Embodiments of the present invention provide a pouch secondary battery which reduces an increase in volume of a sealing portion which is formed by closely attaching a casing to a secondary battery and a fabricating method.

Embodiments of the present invention provide a pouch secondary battery in which a cooling plate configured to cool a secondary battery can be arranged not only in an arrangement direction side in which the secondary battery is arranged but also in a direction perpendicular to the arrangement direction, thereby improving cooling efficiency, and a fabricating method.

BRIEF DESCRIPTION OF THE DRAWINGS

These and other features and advantages of the present invention will become apparent to those with ordinary skill in the art to which the present invention belongs from the following description in conjunction with the accompanying drawings, wherein.

DETAILED DESCRIPTION OF THE INVENTION

Figure 1:
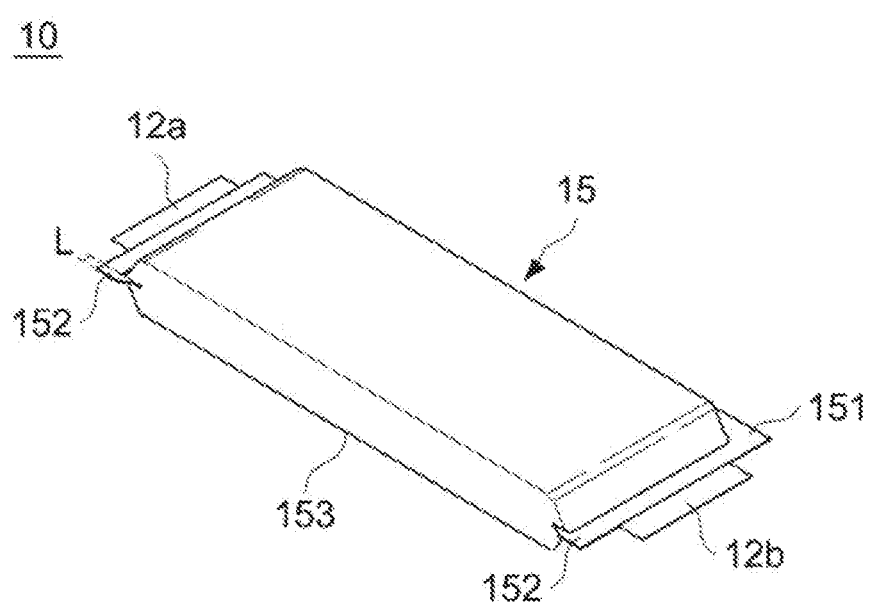
FIG. 1 is a perspective view of a pouch secondary battery according to an embodiment of the present invention.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It is noted that reference to "an embodiment" does not necessarily mean only one embodiment, and different references to "an embodiment" are not necessarily to the same embodiment(s).

The drawings are not necessarily to scale and, in some instances, proportions may have been exaggerated in order to clearly illustrate features of the embodiments.

In descriptions of the invention, when it is determined that detailed descriptions of related well-known functions unnecessarily obscure the gist of the invention, detailed descriptions thereof may be omitted. Some terms described below are defined by considering functions in the invention and meanings may vary depending on, for example, a user or operator's intentions or customs. Therefore, the meanings of terms should be interpreted based on the scope throughout this specification.

The spirit and scope of the invention are defined by the appended claims. The description of the following embodiments is intended to adequately explain the invention to those with ordinary skill in the art to which the present invention belongs or pertains.

It will be further understood that when an element is referred to as being "connected to," or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, the term "and/or" includes any and all combinations of one or more of the associated listed items.

As used herein, singular forms are intended to include the plural forms and vice versa, unless the context clearly indicates otherwise.

It will be further understood that the terms "includes," and "including" are used interchangeably in this specification with the open-ended terms "comprises," and "comprising," to specify the presence of any stated elements and to not preclude the presence or addition of one or more other non-stated elements.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

A secondary battery used in electric vehicles and various electric devices may be, for example, a pouch battery of a lithium ion battery, or of a lithium polymer battery. As used herein, a pouch secondary battery includes a pouch battery of a lithium ion battery, or of a lithium polymer battery.

Figure 2:
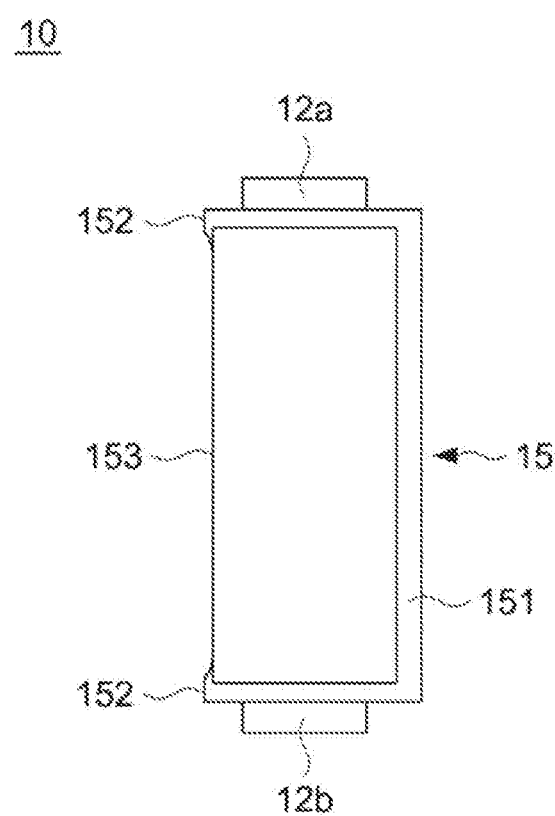
FIG. 2 is a plan view of the pouch secondary battery according to an embodiment of the present invention.

FIG. 1 is a perspective view of a pouch secondary battery 10 according to an embodiment of the present invention. FIG. 2 is a plan view of the pouch secondary battery 10 according to an embodiment of the present invention.

Referring to FIGS. 1 and 2, the pouch secondary battery 10 may include a casing 15 configured to accommodate an electrode assembly 11 (shown in FIG. 4) from which electrode tabs 12a and 12b protrude to the outside of the casing 15. The casing 15 may seal and enclose the electrode assembly 11 while the electrode tabs 12a and 12b extend out of the enclosure formed by the casing 15. The casing 15 may include a close contact portion 153 which is brought into close contact with at least one side surface of the electrode assembly 11. The casing 15 may include also a sealing portion 151 which is formed by securing the edges of the casing 15 around one or more side surfaces of the electrode assembly 11. The sealing portion 151 of the casing 15 may be formed proximate to one or more side surfaces of the electrode assembly 11 other than the at least one side surface to which the close contact portion 153 is in close contact with. The sealing portion 151 may include extending portions 152 protruding perpendicularly with respect to the close contact portion 153 by a predetermined length L at a portion adjacent to the close contact portion 153 in the sealing portion 151.

The casing 15 may be made of a flexible, thermally fusible material. The casing 15 may include one or more layers. For example, the casing 15 may include a metal foil layer such as an aluminum foil layer or an aluminum alloy foil layer. In some embodiments the casing 15 may be formed of a composite material of a metallic material such as aluminum or aluminum alloy and a resin material. In some embodiments, the casing 15 may include a second layer made of a plastic layer covering a first layer made of an aluminum foil, aluminum alloy foil or a composite of aluminum or aluminum alloy with a polymer resin.

The pouch secondary battery 10 may include the electrode assembly 11, a positive electrode tab 12a and a negative electrode tab 12b. The positive electrode tab 12a and the negative electrode tab 12b may protrude from the electrode assembly 11 to the outside of the casing 15. Preferably, the casing 15 may be sealed around the protruding positive and negative electrode tabs 12a and 12b. In some embodiments, the electrode assembly 11 may be of a jelly-roll form wounded in a spiral form with a roll-shaped separator interposed between a positive electrode plate and a negative electrode plate. However, the shape of the electrode assembly 11 is not limited thereto. For example, the electrode assembly 11 may have a stacked shape in which a positive electrode plate, a separator, and a negative electrode plate are sequentially stacked. Furthermore, the positive electrode tab 12a and the negative electrode tab 12b may be electrically connected to a positive electrode plate and a negative electrode plate, respectively, and may protrude from both ends of the electrode assembly 11. However, the present disclosure is not limited thereto. For example, the positive electrode tab 12a and the negative electrode tab 12b may protrude from one end of the electrode assembly 11. The positive electrode tab 12a and the negative electrode tab 12b may be spaced apart from each other. The positive electrode tab 12a and the negative electrode tab 12b may be electrically isolated from each other. In the illustrated embodiment of the present disclosure, a case in which the electrode tabs 12a and 12b protrude from both ends of the electrode assembly 11 will be described.

The casing 15 may accommodate the electrode assembly 11 from which the electrode tabs 12a and 12b protrude. In some embodiments, the casing 15 may include aluminum. The use of aluminum for the casing 15 may be advantageous for obtaining adequate miniaturization, weight reduction, thinning, and resistance to severe thermal environments and mechanical impacts. Accommodation spaces 155 (shown in FIG. 4A) may be formed in the casing 15 in a recessed shape, and the electrode assembly 11 may be disposed in the first accommodation space 155a. The casing 15 may be bonded along an outer periphery of the electrode assembly 11 after the electrode assembly 11 is positioned within the first accommodation space 155a.

The sealing portion 151 may be formed by bonding the casing 15 along the outer periphery of the electrode assembly 11. The bonding of the casing 15 may be made using any suitable method. By way of example and not limitation, the casing 15 may be bonded with the use of an adhesive, application of heat, application of pressure, and the like.

Here, the electrode tabs 12a and 12b may protrude to the outside of the sealing portion 151 at both ends of the electrode assembly 11. For example, the electrode tabs 12a and 12b may protrude from both ends of the electrode assembly 11 in a longitudinal direction (i.e., the vertical direction in FIG. 2) of the electrode assembly 11. However, the present invention is not limited thereto. For example, when the electrode tabs 12a and 12b protrude from one end of the electrode assembly 11 and are spaced apart from each other, the electrode tabs 12a and 12b may protrude from one end of the electrode assembly 11 to the outside of the sealing portion 151.

The volume of the pouch secondary battery is increased by the length of the sealing portion 151. Accordingly, in the pouch secondary battery 10 according to an embodiment of the present invention, the casing 15 is not formed along four sides forming the side surface of the electrode assembly 11 but is formed to be in close contact with the electrode assembly 11 on at least one of the four sides forming the side surface of the electrode assembly 11, thereby reducing the volume of the pouch secondary battery. In the illustrated embodiment, the sealing portion 151 is formed along the three remaining sides of the side surface of the casing 15 other than the side of the casing which is in close contact with the electrode assembly.

The casing 15 is brought into close contact with at least one side surface of the four sides forming the side surface of the electrode assembly 11. A portion of the casing 15 which is brought into close contact with the electrode assembly 11 is referred to herein as a close contact portion. The close contact portion 153 of the illustrated embodiment is formed in close contact with one of the four sides of the side surface of the electrode assembly 11. The other three sides of the side surface of the electrode assembly are adjacent to the sealing portion 151 of the casing 15. By sealing the casing 15 only at the three sides among the four sides of the side surface of electrode assembly, an excess portion of the sealing portion 151 is reduced when a secondary battery is assembled. This may be advantageous in various ways. For example, in an embodiment, a space that may be formed between adjacent secondary batteries may be reduced. That is, secondary batteries may be assembled to form a battery module so that adjacent secondary batteries may be in close contact with each other without creating a space therebetween because the casing 15 may be formed to be in close contact with one surface of the side surfaces of the electrode assembly 11, and the one surface is the surface in which the electrode tabs 12a and 12b are not formed. Accordingly, when assembling the pouch secondary battery 10, the volumetric efficiency thereof may be increased.

According to an embodiment of the present invention, at least one extending portion 152 may exist. In the embodiment of FIG. 1, there are two extending portions 152, a first one adjacent to electrode tab 12a and a second one adjacent to the electrode tab 12b. The extending portions 152 may protrude perpendicularly with respect to the close contact portion 153 by a set or predetermined length L at a portion adjacent to the close contact portion 153. The extending portions 152 may have a set or predetermined length L of less than a few millimeters (mm). The predetermined length L may be lower than 20 mm. Preferably, the predetermined length L may be lower than 10 mm. The extending portions 152 may protrude in the same direction. The extending portions 152 may protrude in a direction that is perpendicular to the direction in which the electrode tabs 12a and 12b protrude. A position at which the extending portions 152 protrude may be at least one side of the electrode assembly 11 in which the electrode tabs 12a and 12b are not formed.

The cooling efficiency of the pouch secondary battery 10 may be improved by forming the close contact portion 153 on at least one of the four sides of the side surface of the pouch secondary battery 10. For example, according to an embodiment, the close contact portion 153 may be brought in contact with a cooling plate (not shown) or the like capable of cooling the pouch secondary battery 10. For example, a plurality of secondary batteries 10 may be stacked in parallel so that the close contact portion 153 of each of the plurality of secondary batteries 10 is positioned downward, and a cooling plate capable of cooling the pouch secondary battery 10 may be disposed on the bottom sides of the plurality of secondary batteries 10 to be in contact with the close contact portion 153 of each of the plurality of secondary batteries 10.

The cooling plate may have a flat shape and can be positioned into close contact with the close contact portion 153. The extending portions 152 which are located at both ends of the close contact portion 153 and extend in a vertical direction from the close contact portion 153, may serve to maintain the arrangement of the pouch secondary battery 10 with respect to the cooling plate. For example, according to an embodiment, grooves capable of accommodating the extending portions 152 may be formed in the cooling plate at predetermined intervals (intervals in which the pouch secondary battery 10 are arranged) for receiving the extending portions 152 and thus maintaining the plurality of secondary batteries 10 securely on the cooling plate.

Further, a concave portion (see 154 in FIG. 4) may be formed and extend in a longitudinal direction at an intermediate position of the close contact portion 153. In an embodiment, the concave portion 154 may have an elongated and narrow shape. The electrode assembly 11 and the casing 15 may be in close contact with each other at the concave portion 154 more than at other portions of the close contact portion 153, and thus, heat transfer between the electrode assembly 11 and the casing 15 may be more efficient through the concave portion 154. Accordingly, formation of the concave portion 154 may be more effective for cooling the pouch secondary battery 10. In yet another embodiment the cooling plate may be shaped to include protrusions shaped to conformally match the concave portions 154 of the secondary batteries.

Further, a method of fabricating the pouch secondary battery 10 according to an embodiment of the present invention will be described.

Figure 3:
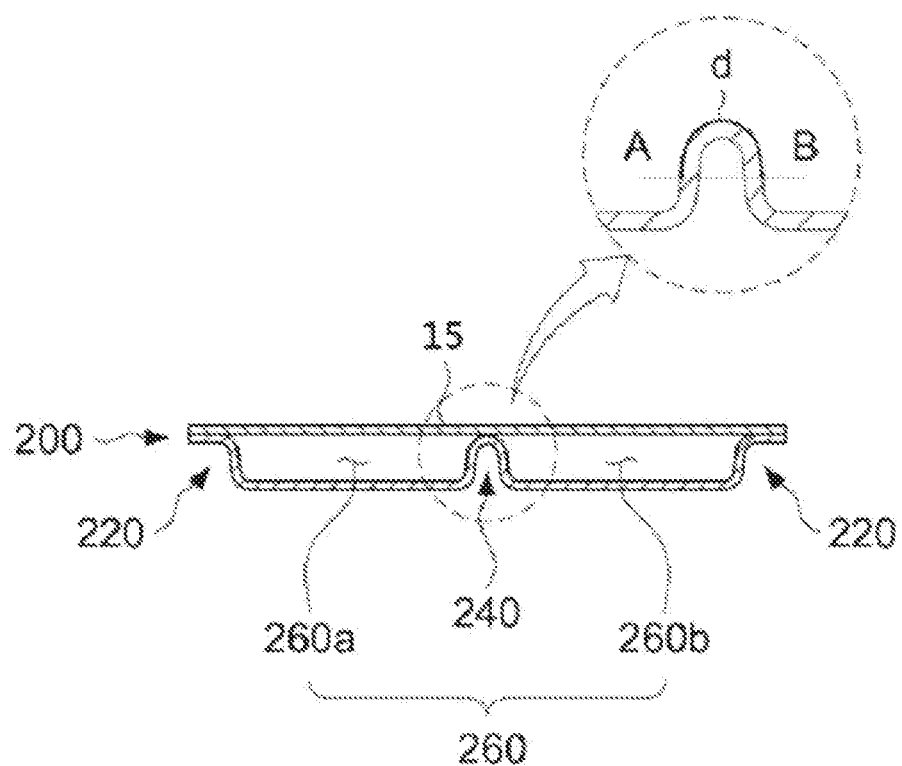
FIG. 3 is a view showing a casing and a press according to an embodiment of the present invention.

FIG. 3 is a view showing a casing 15 and a press frame 200 according to an embodiment of the present invention.

As shown in FIG. 3, the casing 15 may be placed on top of the press frame 200 and then pressed against the press frame 200 to take the shape of the press frame 200.

The press frame 200 may include a plurality of accommodation spaces 260 including a first accommodation space 260a and a second accommodation space 260b and a rounded part 240 formed at a gap between the first accommodation space 260a and the second accommodation space 260b. Further, the press frame 200 may include sealing parts 220 to form a sealing portion 151 of the casing 15. The press frame 200 is symmetrical with regards to the rounded part 240 and may be folded around the rounded part 240 to position the second accommodation space 260b directly on top of the first accommodation space 260a with the top sealing part 220 resting against the bottom sealing part 220.

Although the press frame 200 according to FIG. 3 only shows one pair of accommodation spaces 260a and 260b the present invention is not limited thereto. According to some embodiments, the press frame 200 may include a plurality of pairs of accommodation spaces for forming a casing that can accommodate a plurality of electrode assemblies at one time.

The rounded part 240 may be formed at an interval between the respective accommodation spaces 260a and 260b. The rounded part 240 may be formed to protrude convexly in a direction opposite to a recessed direction of the accommodation space 260. In an embodiment, the rounded part 240 may have a convex curved shape. For example, a cross section of the rounded part 240 may be semicircular.

Although the shape of the rounded part 240 is not limited, a circumference of the cross section of the rounded part 240 may be a semicircular circumference d from side A to B shown in FIG. 3 when the cross section of the rounded part 240 is semicircular. Here, side A means an adjacent side of a first accommodation space 260a, and side B means an adjacent side of a second accommodation space 260b. An uppermost portion of the rounded part 240 may be located at the same or substantially the same height as the sealing parts 220. However, the invention is not limited thereto and the uppermost portion of the rounded part 240 may be located lower than the sealing parts 220.

The rounded part 240 may prevent the casing 15 from excessively thinning or breaking during the manufacturing process wherein the casing is pressed against the press frame 200 for the casing 15 to take the shape of the press frame. This is because the rounded part 240 has an upwardly convex shape such that a concentration of stress received by the rounded part 240 may be minimized by the shape of the rounded part 240. Accordingly, it is possible to prevent the casing 15 from excessive thinning or from breaking.

The casing 15 may be provided in a form of a sheet including aluminum or an aluminum alloy and may be pressed to a side in which the press frame 200 is located. Accordingly, the casing 15 may be pressed into the shape of the press frame 200.

Figure 4A:
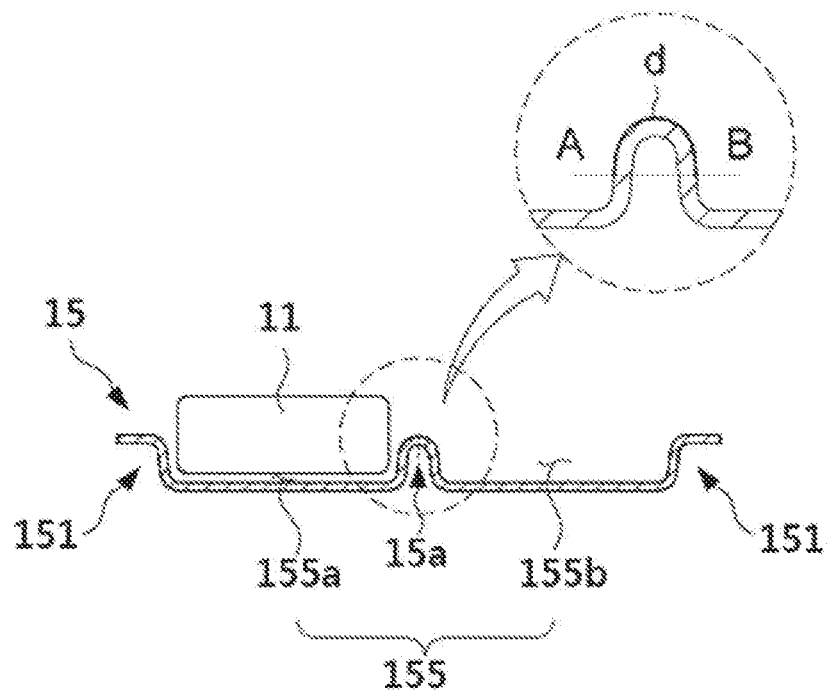
FIG. 4A is a view showing a state in which an electrode assembly is arranged in an accommodation space of a casing according to an embodiment of the present invention.
Figure 4B:
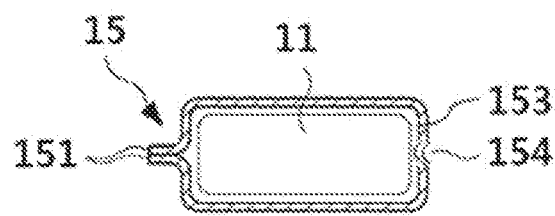
FIG. 4B is a view showing a state in which the casing according to an embodiment of the present invention is bonded along an outer periphery of the electrode assembly.

FIG. 4A is a view showing a state in which the electrode assembly 11 is arranged in accommodation spaces 155 of the casing 15 according to an embodiment of the present invention. FIG. 4B is a view showing a state in which the casing 15 according to an embodiment of the present invention is bonded along an outer periphery of the electrode assembly 11.

Referring to FIGS. 4A and 4B, the electrode assembly 11 may be accommodated in the accommodation space 155 of the casing 15 when the casing 15 is pressed by the press frame 200.

In the following description, in the accommodation spaces 155 of the casing 15, a space in which the electrode assembly 11 is initially positioned is defined as a first accommodation space 155a and a space in which the electrode assembly 11 is not initially positioned is referred to as a second accommodation space 155b.

First, the casing 15 is placed on the press frame 200 and pressed against the press frame 200 to take the shape of the press frame 200. When the shape of the casing 15 is formed, the electrode assembly 11 may then be positioned in the first accommodation space 155a of the casing 15.

When the electrode assembly 11 is positioned within the first accommodation space 155a, then a rounded portion 15a of the casing may be unfolded and spread along at least one side surface of the side surfaces of the electrode assembly 11 by folding the second accommodation space 260b of the press frame 200 to pivot around the rounded part 240.

In an embodiment, the rounded portion 15a may have an upwardly convex curved shape. For example, a cross section of the rounded portion 15a may be semicircular. Accordingly, the rounded portion 15a, which has a convex shape, may be spread along one side surface of the electrode assembly 11.

Here, a surface with which the rounded portion 15a is closely contacted may be a surface on which electrode tabs 12a and 12b are not formed. That is, a close contact portion 153 that is brought into close contact with the electrode assembly 11 may be formed as the rounded portion 15a is unfolded or spread.

As described above, a concave portion 154 corresponding to a center of the rounded portion 15a may be formed in the close contact portion 153 while the rounded portion 15a having the convex shape is brought into close contact with one side surface of the electrode assembly 11. Further, although the shape of the rounded portion 15a is not limited, a length of the circumference of the rounded portion 15a in a vertical cross section with respect to the rounded portion 15a may be a circumference d of a semicircle when the cross section of the rounded portion 15a is semicircular. That is, a circumference of the rounded portion 15a may be a semicircular circumference d from side A to B shown in FIG. 4A. Here, side A means an adjacent side of the first accommodation space 155a, and side B means an adjacent side of the second accommodation space 155b. Accordingly, the rounded portion 15a may be a portion formed by a curved surface from A to B. Portions other than a portion to be the close contact portion 153 may be a part of the extending portion 152 in the rounded portion 15a of the casing 15. Since the shape of the rounded portion 15a corresponds to the curved surface, a portion (a portion adjacent to the close contact portion 153 in the extending portion 152) that is not in close contact with the electrode assembly 11 may slightly protrude when the casing 15 is folded as shown in FIG. 4B.

Each accommodation space 155a and 155b of the casing 15 is formed to have a shape and size to receive partially the electrode assembly 11 so that when the two accommodation spaces 155a and 155b are brought in alignment one on top of the other they fully enclose the electrode assembly. Hence, as shown in FIG. 4B, the second accommodation space 155b may cover the upper side of the electrode assembly 11 when the rounded portion 15a is brought into close contact with the electrode assembly 11, and the first accommodation space 155a may cover the lower part of the electrode assembly. The lower part and the upper part may be the same or substantially the same as illustrated in FIGS. 4A and 4B.

Accordingly, the electrode assembly 11 is accommodated and sealed in the casing 15 so that the pouch secondary battery 10 may be formed.

As described above with reference to the accompanying drawings, a manufacturing method according to an embodiment of the present invention includes providing the press frame 200, placing the casing 15 in a flat foil form on top of the press frame 200 and pressing the casing 15 to take the shape of the press frame 200. The method further comprises positioning an electrode assembly 11 into the first accommodation space 155a of the casing 15, folding the press frame 200 around the rounded part 240 of the press frame 200 to position the second accommodation space 155b of the casing on top of the electrode assembly and bonding the casing to form the sealing portion 151 by pressing the sealing portions 220 of the press frame against each other.

While various embodiments of the present invention have been described above in detail, it may be understood by those skilled in the art that the embodiments may be variously modified without departing from the scope of the present invention. Therefore, the scope of the present invention is defined not by the described embodiments but by the appended claims, and encompasses equivalents that fall within the scope of the appended claims.

DESCRIPTION OF REFERENCE NUMERALS

10: POUCH SECONDARY BATTERY
11: ELECTRODE ASSEMBLY
12a and 12b: ELECTRODE TAB
15: CASING
15a: ROUNDED PORTION
151: SEALING PORTION
152: EXTENDING PORTION
153: CLOSE CONTACT PORTION
154: CONCAVE PORTION
155, 155a and 155b: ACCOMMODATION SPACES
200: PRESS FRAME
220: SEALING PARTS
240: ROUNDED PART
260, 260a and 260b: ACCOMMODATION SPACES

What is claimed is:

1. A pouch type secondary battery comprising:
   a pouch type casing configured to accommodate an electrode assembly from which electrode tabs protrude,
   wherein a sealing portion formed on three of four sides of the pouch type secondary battery and a non-sealing portion formed on one remaining side are formed by the casing, and
   wherein the non-sealing portion includes:
   a rounded concave portion formed to be concave toward the electrode assembly after the pouch type casing is folded to accommodate the electrode assembly, the rounded concave portion extending in a longitudinal direction of the non-sealing portion.

2. The pouch type secondary battery of claim 1, wherein an extending portion protruding with respect to the non-sealing portion is formed in the sealing portion in a portion adjacent to the non-sealing portion.

3. The pouch type secondary battery of claim 1,
   wherein a plurality of accommodation spaces configured to accommodate the electrode assembly and a rounded portion having an upwardly convex shape located at a gap between the plurality of accommodation spaces are formed in the casing before the electrode assembly is accommodated in the casing, and the rounded concave portion is at least a part of the rounded portion.

4. The pouch type secondary battery of claim 1, wherein the pouch type casing includes aluminum or an aluminum alloy.

5. The pouch type secondary battery of claim 1,
wherein before the pouch type casing is folded to enclose the electrode assembly the pouch type casing includes first and second accommodating spaces configured to accommodate the electrode assembly and a rounded portion having an upwardly convex shape located between the first and second accommodation spaces, and each of the first and second accommodating spaces has a constant depth along an entirety of its length.

6. A pouch type secondary battery comprising:
a pouch type casing enclosing an electrode assembly to form:
a sealing portion formed on at least one side of the pouch type secondary battery; and,
a non-sealing portion formed on at least one side of the pouch type secondary battery,
wherein the sealing portion includes:
an extending portion of the sealing portion protruding with respect to the non-sealing portion and the extending portion is connected to the non-sealing portion,
wherein the non-sealing portion includes:
a rounded concave portion formed to be concave toward the electrode assembly after the pouch type casing is folded to accommodate the electrode assembly, the rounded concave portion extending in a longitudinal direction of the non-sealing portion.

7. The pouch type secondary battery of claim 6, wherein a plurality of accommodation spaces having a recessed shape configured to accommodate the electrode assembly and a rounded portion having an upwardly convex shape located at a gap between the plurality of accommodation spaces are formed in the casing before the electrode assembly is accommodated in the casing.

8. The pouch type secondary battery of claim 7, wherein the casing includes aluminum or an aluminum alloy.

9. The pouch type secondary battery of claim 7, wherein the rounded portion is formed to protrude convexly in a direction opposite to a recessed direction of the accommodation spaces.

10. The pouch type secondary battery of claim 6, wherein the extending portion is protruding substantially perpendicularly with respect to the non-sealing portion.

* * * * *

UNITED STATES PATENT AND TRADEMARK OFFICE
CERTIFICATE OF CORRECTION

PATENT NO. : 11,276,893 B2
APPLICATION NO. : 16/444887
DATED : March 15, 2022
INVENTOR(S) : Tae Il Kim et al.

It is certified that error appears in the above-identified patent and that said Letters Patent is hereby corrected as shown below:

On the Title Page

Item [56], insert:
--FOREIGN PATENT DOCUMENTS
CN 102473880 A 5/2012--

Signed and Sealed this
Twenty-sixth Day of April, 2022

Katherine Kelly Vidal
*Director of the United States Patent and Trademark Office*